(12) United States Patent
Mekuria (10) Patent No.: US 6,724,939 B1
(45) Date of Patent: Apr. 20, 2004

(54) LOW COMPLEXITY JPEG DECODER

(75) Inventor: Fisseha Mekuria, Lund (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/386,513

(22) Filed: Aug. 31, 1999

(51) Int. Cl.[7] ............................................... G06K 9/36
(52) U.S. Cl. ................. 382/233; 382/248; 375/240.25; 348/403.1
(58) Field of Search ................................ 382/232, 248, 382/250, 251, 236, 233, 240; 348/14.13, 407.1, 403.1; 375/240.18, 317, 240.25; 358/403.1

(56) References Cited

U.S. PATENT DOCUMENTS

| | | | |
|---|---|---|---|
| 4,941,043 A | | 7/1990 | Jass |
| 5,262,854 A | * | 11/1993 | Ng .......................... 375/240.24 |
| 5,278,646 A | | 1/1994 | Civanlar et al. |
| 5,734,755 A | * | 3/1998 | Ramchandran et al. ..... 382/250 |
| 5,809,173 A | * | 9/1998 | Liu et al. ..................... 382/233 |
| 5,911,006 A | * | 6/1999 | Funamoto et al. .......... 382/232 |

OTHER PUBLICATIONS

A. Baskurt, et al., "Iterative Constrained Restoration of DCT–Compressed Images," Signal Processing European Journal Devoted to the Methods and Applications of Signal Processing, vol. 17, No. 3, Jul. 1, 1989, pp. 201–211.

N. N. Krasil'nikov, et al., "Comparative Analysis of Zonal and Threshold Methods of Image Coding," Telecommunications and Radio Engineering, vol. 46, No. 11, Nov. 1, 1991, pp. 60–64.

* cited by examiner

Primary Examiner—Jon Chang
Assistant Examiner—Colin LaRose
(74) Attorney, Agent, or Firm—Burns, Doane, Swecker and Mathis, L.L.P.

(57) ABSTRACT

A decoder includes an indexing and thresholding stage that receives a compressed image matrix and produces therefrom a signal that is based on a comparison of at least one element in the compressed image matrix with a predetermined threshold value. A transform stage is coupled to receive the signal from an output of the indexing and thresholding stage, wherein the transform stage selectively decodes the compressed image matrix based on the signal. A row column index for each coefficient in a DCT matrix is used, together with a threshold value, to access each coefficient, and decide if the entry is greater than the threshold value. This information is used by an IDCT decoder to avoid unnecessary MAC operations for those entries with values below the threshold value. By not performing the IDCT on the DCT matrix values below the threshold value, the computational requirement of the decoder is significantly reduced, thereby reducing the computational speed requirement for the decoder.

34 Claims, 6 Drawing Sheets

LOW COMPLEXITY JPEG DECODER

BACKGROUND OF THE INVENTION

The present invention relates to the field of digital signal processing. More particularly, the present invention relates to the field of decompression of an image or video signal in a mobile communication device.

With the popularity of mobile communications and the availability of bandwidth increasing, there exists a need in the field of mobile communications to transmit still and moving images (video) from one user to another in addition to the traditional audio only transmissions. In order for mobile communication devices to accommodate the increased digital signal processing required for the handling of image data, the systems and methods used by the mobile communication device must comply with a low computation and memory requirement as well as maintain low power consumption to enable long battery life.

Standards such as those produced by the Joint Photographics Experts Group (JPEG), the Moving Pictures Experts Group (MPEG), and the Px64 standard are available for the transmission of very low bit-rate audio visual data.

Conventional compression/decompression systems process the JPEG, MPEG, and Px64 standards using substantially the same basic system. The discrete cosine transform (DCT) system and method in one and two-dimensions is a popular method used in digital signal processing for speech and image signal compression. This is due to the fact that the DCT statistically approaches the performance of the optimal Karhunen Loeve Transform (KLT) for highly correlated signals. The DCT has the property that, for a typical set of input image data $Y_{m,n}$, most of the visually significant information is compactly represented in just a few DCT coefficients $U_{p,q}$, after transformation, as shown in the following equation:

$$U_{p,q} = \frac{4}{N^2} \alpha_q \alpha_p \sum_{m=1}^{N-1} \sum_{n=0}^{N-1} Y_{m,n} \cos\frac{\pi(2m+1)p}{2N} \cos\frac{\pi(2n+1)q}{2N} \quad (1)$$

where $$\alpha_p = \alpha_q = \frac{1}{\sqrt{2}}$$

when m=0, otherwise $\alpha_p = \alpha_q = 1$. For a given set of 2-D input image data, $Y_{m,n}$ where m,n={0,1,2, ... N−1}, the 2-D DCT transform coefficients $U_{p,q}$ where p,q={0,1,2, ... N−1} are determined by equation (1).

The DCT is an invertible transform, hence the original image sequence $Y_{m,n}$ can be reconstructed by the 2-D inverse discrete cosine transform (IDCT) using the following equation:

$$Y_{m,n} = \frac{4}{N^2} \sum_{p=1}^{N-1} \sum_{q=0}^{N-1} \alpha_q \alpha_p U_{p,q} \cos\frac{\pi(2m+1)p}{2N} \cos\frac{\pi(2n+1)q}{2N} \quad (2)$$

which is identical in form with the forward 2-D DCT given in equation (1) apart from a scaling factor of $$\frac{4}{N^2}.$$

This means that there is no asymmetry of complexity between the coder and decoder. Thus, image coders and decoders such as JPEG coders and decoders share the same complexity.

For the two dimensional image input, $Y_{m,n}$, the $N^2$ values of Y are the elements of a square array, a sub-image of size N×N. Typical arrays in image coding applications are N=4, 8, 16 and 32 where the JPEG image codec uses N=8. The partitioning into sub-images is particularly efficient in cases where correlations are localized to neighboring pixels, as is the case in image and speech signals.

Figure 1:
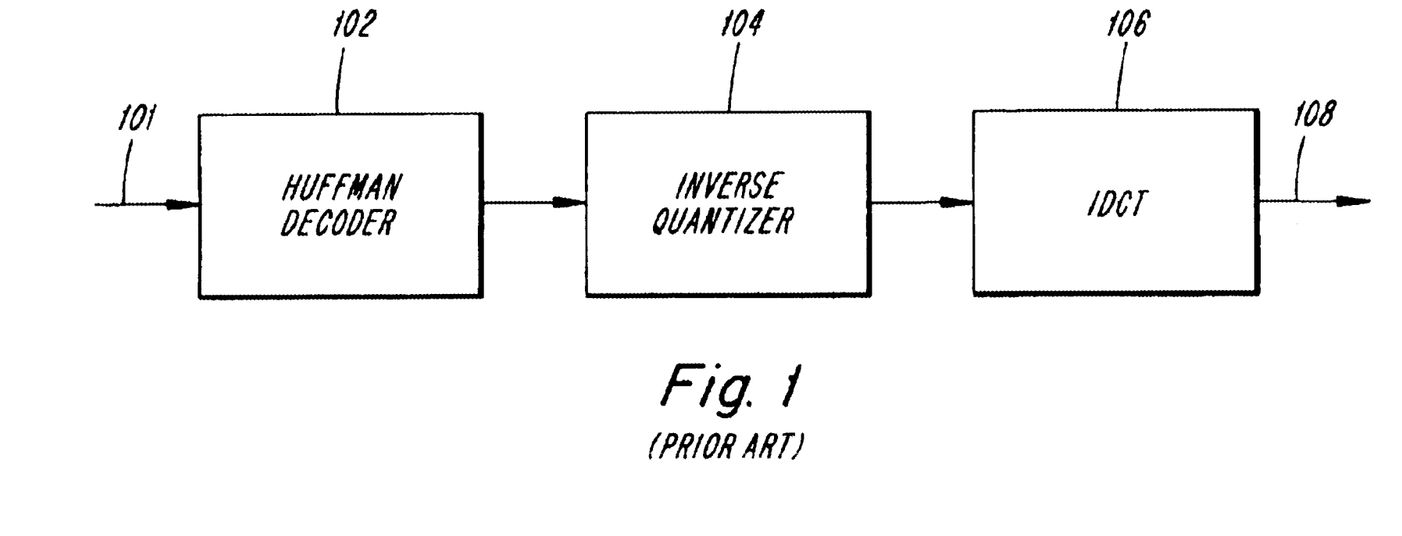
FIG. 1 is a block diagram of a conventional image decoder.

As illustrated in FIG. 1, a conventional decompression system is provided with a compressed input data stream 101. The compressed input data stream 101 is in the form of DCT matrix. The input data stream 101 is comprised of, for example, successive 8×8 DCT matrixes and is provided to the input of a Huffman decoder 102. The Huffman decoded signal is then inverse quantized in block 104 and then a two dimensional IDCT is performed in block 106 which yields the decompressed output image signal 108.

The IDCT computation described above requires considerable time, computational power, and memory. This is, in part, due to the row-column approach used by the conventional IDCT computations. The row-column approach uses the separability property of the 2-D DCT. This property allows for a decomposition of the 2-D DCT into two 1-D DCT transforms. Therefore, for the computation of a 2-D N×N DCT transform, the computational time required is about N times the computational time requirement for a 1-D N-point DCT.

There are a number of computational algorithms which have been developed to shorten the computational time required for a 2-D DCT. The algorithms can be grouped into two categories.

The first category is a 2-D DCT transformation without the partitioning of the image data into sub-images. This method performs a fast computation of the 1-D DCT using a 2N-point symmetric Fast Fourier Transform (FFT) and then saving N-terms in the FFT. The computational time required for the first method is $N^2 \log_2 N$ Multiply and Accumulate (MAC) operations which would require a large buffer memory.

The second category is based on decomposing K×K image data into smaller N×N sub-images and then applying the DCT on row and column. Further, in JPEG applications where N=8, image data is organized into zig-zag serial data sequences using a 1×$N^2$ vector. This arrangement allows for further fast DCT implementation algorithms, such as the conventional row-column method, the improved row-column method, and the fast DCT method.

All of the above techniques, however, require considerable time, computational power, and memory. Therefore, there is a need for a system and method which will decompress compressed image data, such as. JPEG, MPEG, or Px64 data without consuming as many resources as conventional decompression methods and systems.

BRIEF SUMMARY OF THE INVENTION

In accordance with one aspect of the present invention, a decoder is provided that includes an indexing and thresholding stage that receives a compressed image matrix and produces therefrom a signal that is based on a comparison of at least one element in the compressed image matrix with a predetermined threshold value. A transform stage is coupled to receive the signal from an output of the indexing and thresholding stage, wherein the transform stage selectively decodes the compressed image matrix based on the signal.

In accordance with another aspect of the present invention, a communication device is provided that includes a receiver and a decoder. The decoder includes an indexing and thresholding stage that receives a compressed image matrix via the receiver and produces therefrom a signal that is based on a comparison of at least one element in the compressed image matrix with a predetermined threshold value. A transform stage is coupled to receive the signal from an output of the indexing and thresholding stage, wherein the transform stage selectively decodes the compressed image matrix based on the signal.

In accordance with another aspect of the present invention, a method for decoding a compressed image matrix is provided which produces a signal which is based on a comparison of at least one element in the compressed image matrix with a predetermined threshold value, and selectively decodes the compressed image matrix signal based on the signal.

In accordance with another aspect of the present invention, an indexing and thresholding apparatus is provided that includes an input for receiving a compressed image matrix, and a processor for producing a signal that is based on a comparison of at least one element in the compressed image matrix with a predetermined threshold value.

In accordance with another aspect of the present invention, a coder is provided that includes a transform stage for producing a compressed image matrix from an input image, and an indexing and thresholding stage that receives the compressed image matrix and produces therefrom a signal that is based on a comparison of at least one element in the compressed image matrix with a predetermined threshold value.

In accordance with another aspect of the present invention, a communication device is provided that includes a transmitter and a coder. The coder includes a transform stage for producing a compressed image matrix from an input image, and an indexing and thresholding stage that receives the compressed image matrix and produces therefrom a signal that is based on a comparison of at least one element in the compressed image matrix with a predetermined threshold value.

In accordance with another aspect of the present invention, a method for encoding image data is provided that includes producing a compressed image matrix by encoding the image data, and producing a signal which is based on a comparison of at least one element in the compressed image matrix with a predetermined threshold value.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

The present invention conserves computational resources by recognizing and utilizing particular properties of the DCT matrix. The DCT matrix has the property that, for a typical set of input image data $Y_{m,n}$, most of the visually significant information is compactly represented in just a few DCT transform coefficients ($U_{p,q}$) after the transformation. That is, the DCT matrix is a sparse matrix with few non-zero entries. The DCT is selected for compressing the image data because of its ability to satisfy the compression requirement that is imposed for low memory storage and low transmission time through bandlimited wireless networks. For example, in a GSM system, data rates are limited to 9.6 kbits/sec; in a General Packet Radio Service (GPRS) system, data rates are limited to 76.8 kbits/sec; and in a Wideband Code Division Multiple Access (WCDMA) system, data rates are limited to 384 kbits/sec.

In accordance with one aspect of the invention, the row column index for each coefficient in the DCT matrix is used, together with a threshold value, to access each coefficient and to decide if the entry is greater than the threshold value. The threshold value can be set, for example, below, within, or above the range of coefficients in the DCT matrix. In exemplary embodiments of the present invention, the threshold value is set within the lower half of the range of coefficients in the DCT matrix. In alternative embodiments of the present invention, each coefficient is normalized by dividing each coefficient by the value of the greatest coefficient in the DCT matrix. The normalized coefficients are compared with a threshold value, e.g., in the range 0.0 to about 0.5. This information is used by the IDCT decoder to avoid unnecessary MAC operations for those entries with values below the threshold. By not performing the IDCT on the coefficients that are below the threshold, the computational requirement of the decoder is significantly reduced, thereby reducing the computational speed requirement (e.g., as measured in Millions of Instructions Per Second or MIPS) for the decoder. One skilled in the art will readily appreciate that the value of the threshold can vary based on specific application parameters and quality of service preferences.

Figure 2A:
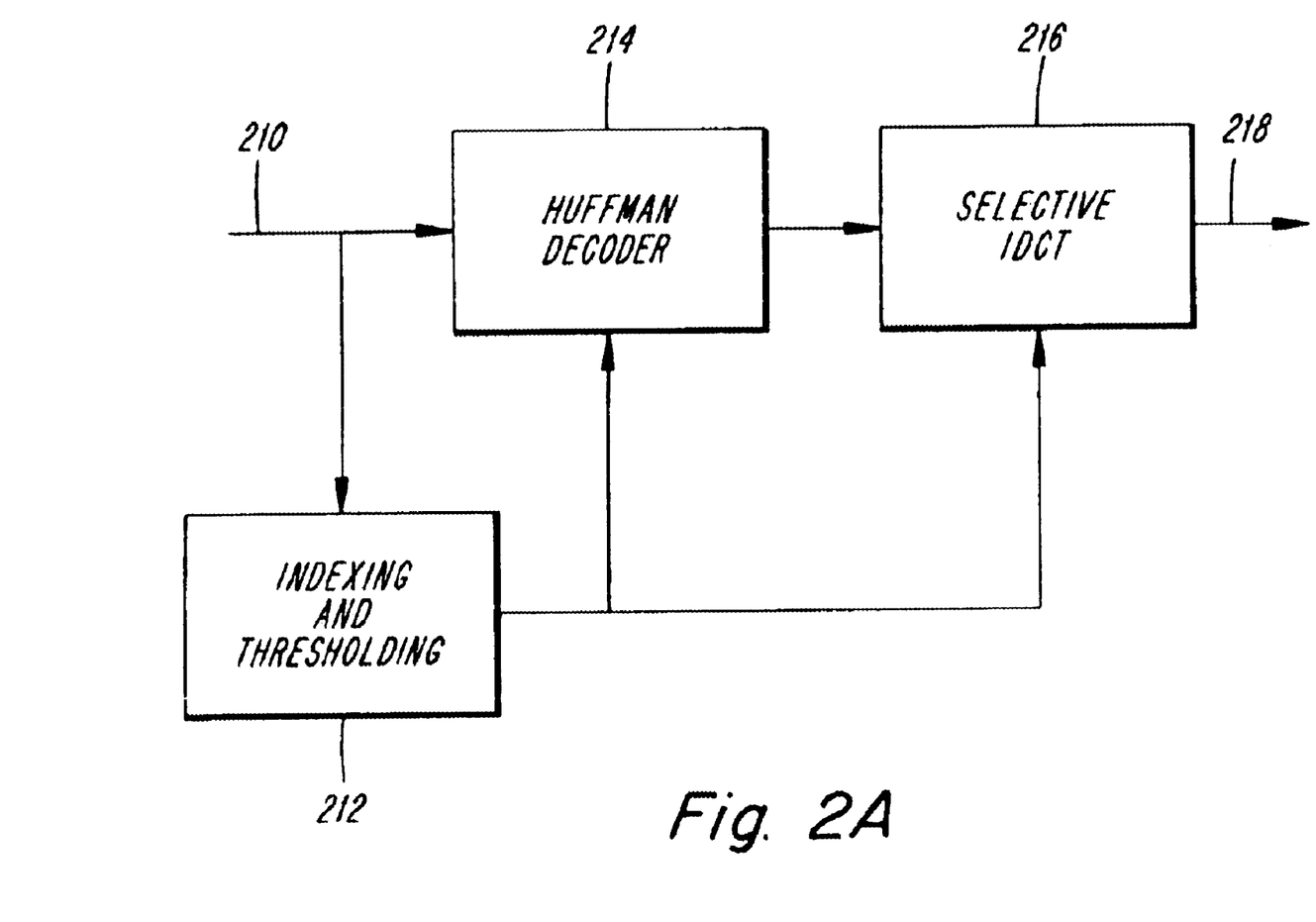
FIGS. 2A & 2B illustrate exemplary embodiments of the decoder of the present invention.

FIG. 2A illustrates a block diagram of the decoding system and method of an exemplary embodiment of the present invention. A compressed image data matrix 210, for example an 8×8 JPEG matrix with each matrix element being represented by an eight-bit number, is provided as an input to an indexing and thresholding stage 212 and also to a Huffman decoder 214. In an exemplary embodiment of the present invention, the indexing and thresholding stage 212 traverses the compressed image data matrix 210 and determines which values of the matrix above a threshold. Each transform coefficient, y(i,j), is represented by a 2-D row by column (i×j) index (i,j). The thresholding stage 212 decides for each coefficient whether or not y(i,j) is greater than the threshold value. The indices are saved if y(i,j) is greater than the threshold value, otherwise they are discarded.

In another exemplary embodiment of the present invention, the indexing and thresholding stage 212 traverses the compressed image data matrix 210 in a zigzag manner starting with the first index (0,0), e.g., starting with (0,0) in an 8×8 matrix and then moving to (0,1), (1,0), (2,0), (1,1), (0,2), (0,3), (1,2), (2,1), (3,0), (4,0), (3,1), (2,2), (1,3), (0,4), ..., (6,7), (7,6), (7,7). In this embodiment, in order to reduce unnecessary processing, the thresholding stage 212 may be advantageously stopped after a predetermined number of indices, e.g., two pairs, are discarded since the higher indices are most probably below the threshold due to the properties of the DCT.

Using the 8×8 JPEG image data matrix as an example, a corresponding 8×8 element matrix, herein referred to as an index matrix, is created and stored in which each element is represented by only a single bit. The single bit indicates whether or not a value above the threshold is present in the original compressed image data matrix. An exemplary index matrix [Z] is shown below:

$$[Z] = \begin{bmatrix} 1 & 1 & 1 & 1 & 0 & 0 & 0 & 0 \\ 1 & 1 & 1 & 0 & 0 & 0 & 0 & 0 \\ 1 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

After the creation of the index matrix, a signal based on the index matrix, is provided to an input of the Huffman Decoder stage 214 and an input of the selective IDCT stage 216. The output of the Huffman Decoder stage 214 is provided to the input of the selective IDCT stage 216. The IDCT stage 216 can include an inverse quantizer (not shown) that assists the IDCT stage 216 in inverse transforming the output of the Huffman Decoder stage 214. The output of the selective IDCT stage 216 is the reconstructed image signal 218.

In an alternative embodiment of the present invention, a separate inverse quantizer (not shown) is present between the Huffman Decoder stage 214 and IDCT stage 216 which also receives the output signal from the indexing and thresholding stage 212. Both the Huffman Decoder stage 214 and the selective IDCT stage 216 base their operation on the signal from the indexing and thresholding stage 212 such that they operate on only the values above the threshold of the compressed image data matrix 210.

In an exemplary embodiment of the present invention, the index matrix is stored in a memory contained within a digital signal processor. Alternatively, the index matrix can be stored in any memory available which can accommodate the size of the index matrix, for example, an 8×8 matrix containing a total of 64 bits.

The signal based on the index matrix produced by the indexing and thresholding stage 212 can include the actual index matrix or may instead directly represent either the indices of the coefficients of the compressed image data matrix that are above or below the threshold. That is, the Huffman decoder stage 214 and the IDCT stage 216 can be adapted to alternatively use the image matrix, the indices of the coefficients that are above the threshold, and/or the indices of the coefficients that are equal to or below the threshold as a controlling parameter for causing operation on only the coefficients of the compressed image data matrix 321 that are above the threshold.

Figure 2B:
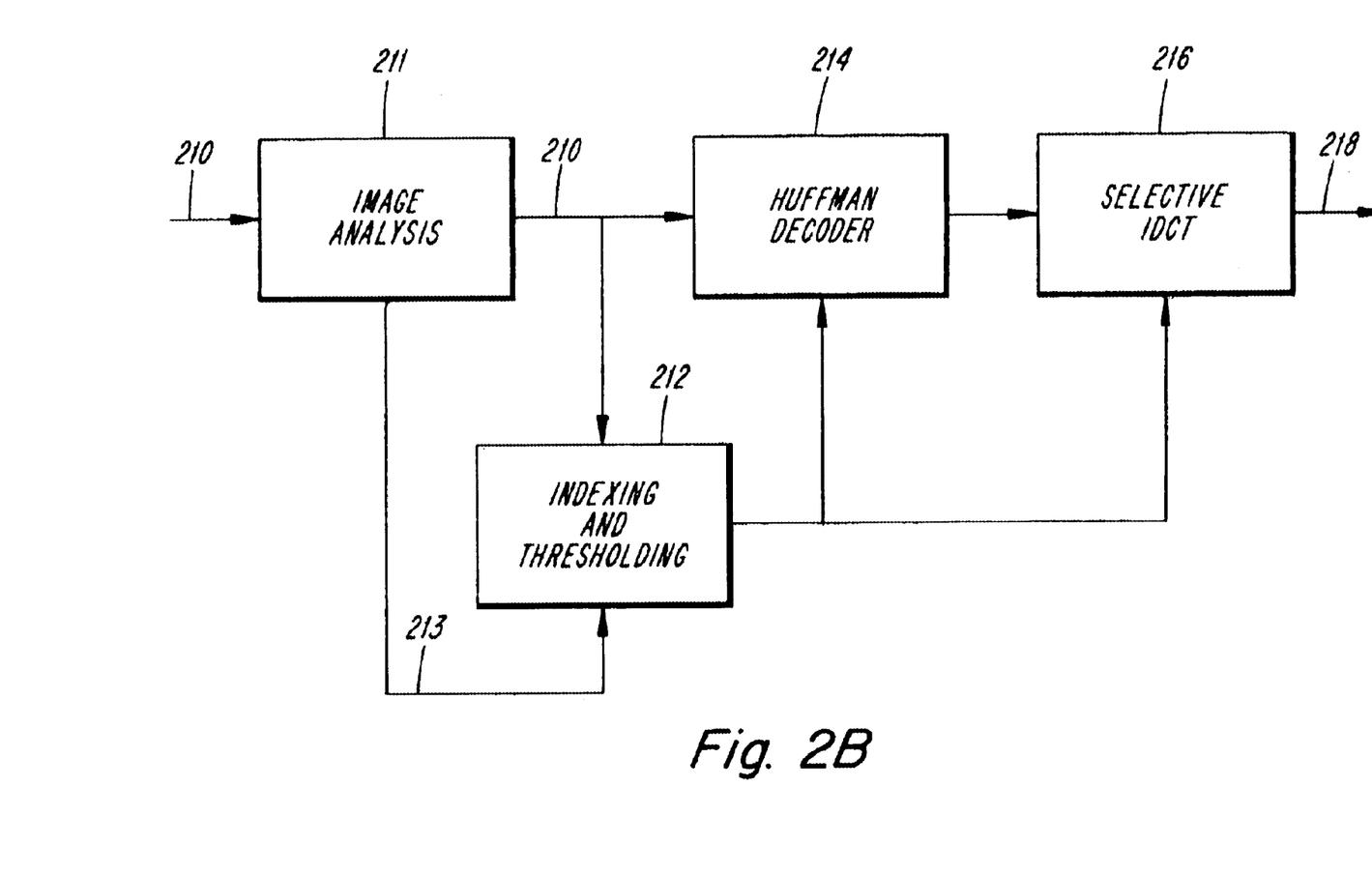

FIG. 2B illustrates an alternative embodiment of the present invention in which image analysis stage 211 is added in order to further reduce the computational requirements of the present invention. Image analysis stage 211 calculates the rate of change of the coefficients in successive frames of the compressed image data matrix 210. Since it is highly likely that sequential frames of related images will possess identical or nearly identical index matrixes due to the similarities of one sequential frame to another, computational time can be reduced by sending a signal 213 to the indexing and thresholding stage 212 to create a new index matrix only once every x frames. The value of x is determined by the image analysis stage 211 based on the rate of change of the image. For example, an image which is changing rapidly may require a value of x equal to 1 or 2. On the other hand, an image which is fairly still, for example, a talking head or a slide, may require a value of x equal to 3 or 4.

Figure 3A:
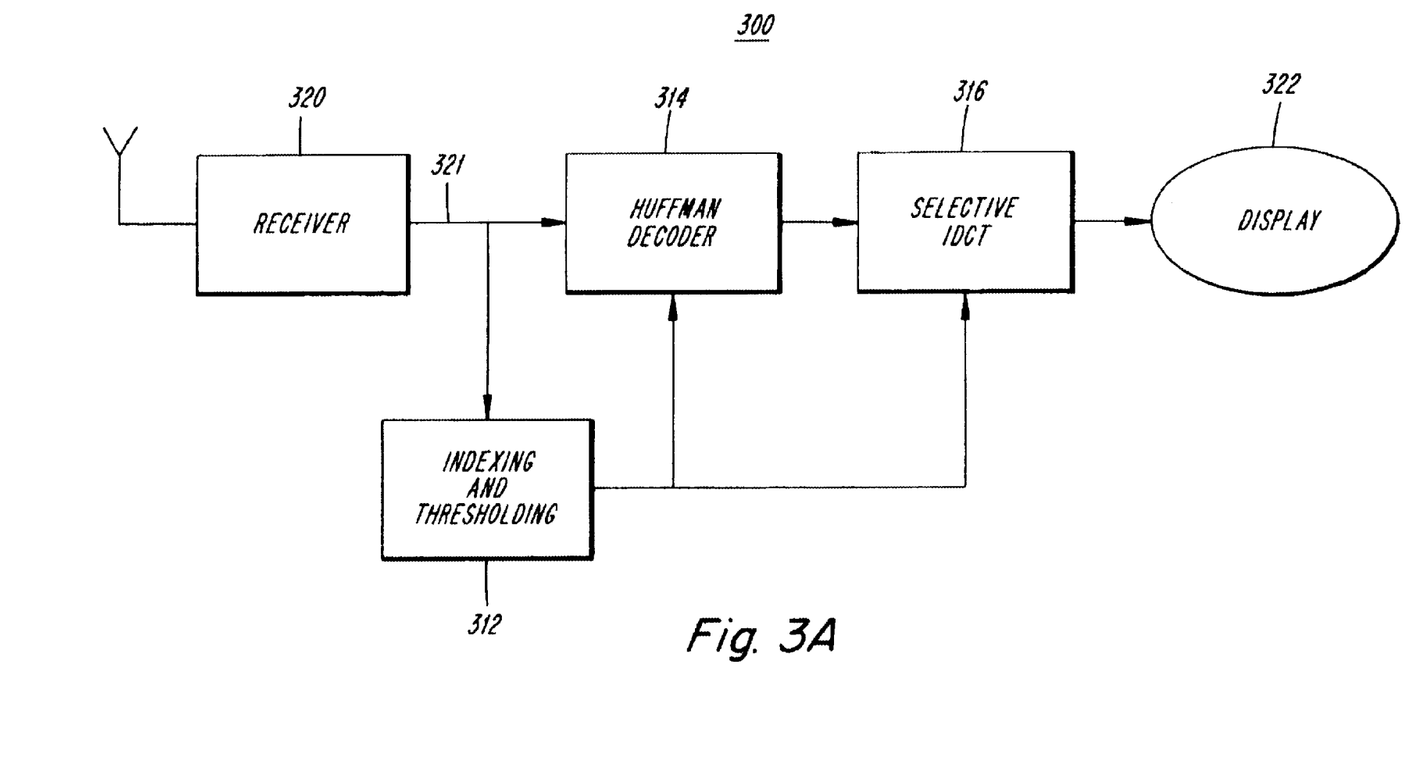
FIGS. 3A & 3B illustrate exemplary receiver stages of a mobile communication device employing the system and method of the present invention.

FIG. 3A illustrates a receiver stage 300 for a mobile communication device such as a mobile radio telephone or a personal digital assistant (PDA) which utilizes the present invention. A signal is received via receiver 320 and the compressed image data matrix 321 is extracted and provided as an input to the Huffman decoder stage 314 and the indexing and thresholding stage 312. In an exemplary embodiment of the present invention, the indexing and thresholding stage 312 creates the index matrix by traversing the compressed image data matrix 321 and determines which values of the matrix are above a threshold value.

After the creation of the index matrix, a signal based on the index matrix is provided to an input of the Huffman Decoder stage 314 and an input of the selective IDCT stage 316. The output of the Huffman decoder stage 314 is provided to the input of the selective IDCT stage 316. The output of the selective IDCT stage 316 is the reconstructed image signal and is stored into a memory (not shown) and/or displayed on the display 322 of the mobile communication device. Both the Huffman decoder stage 314 and the selective IDCT stage 316 use the signal based on the index matrix to operate on only the values of the compressed image data matrix 321 that exceed the threshold.

Figure 3B:
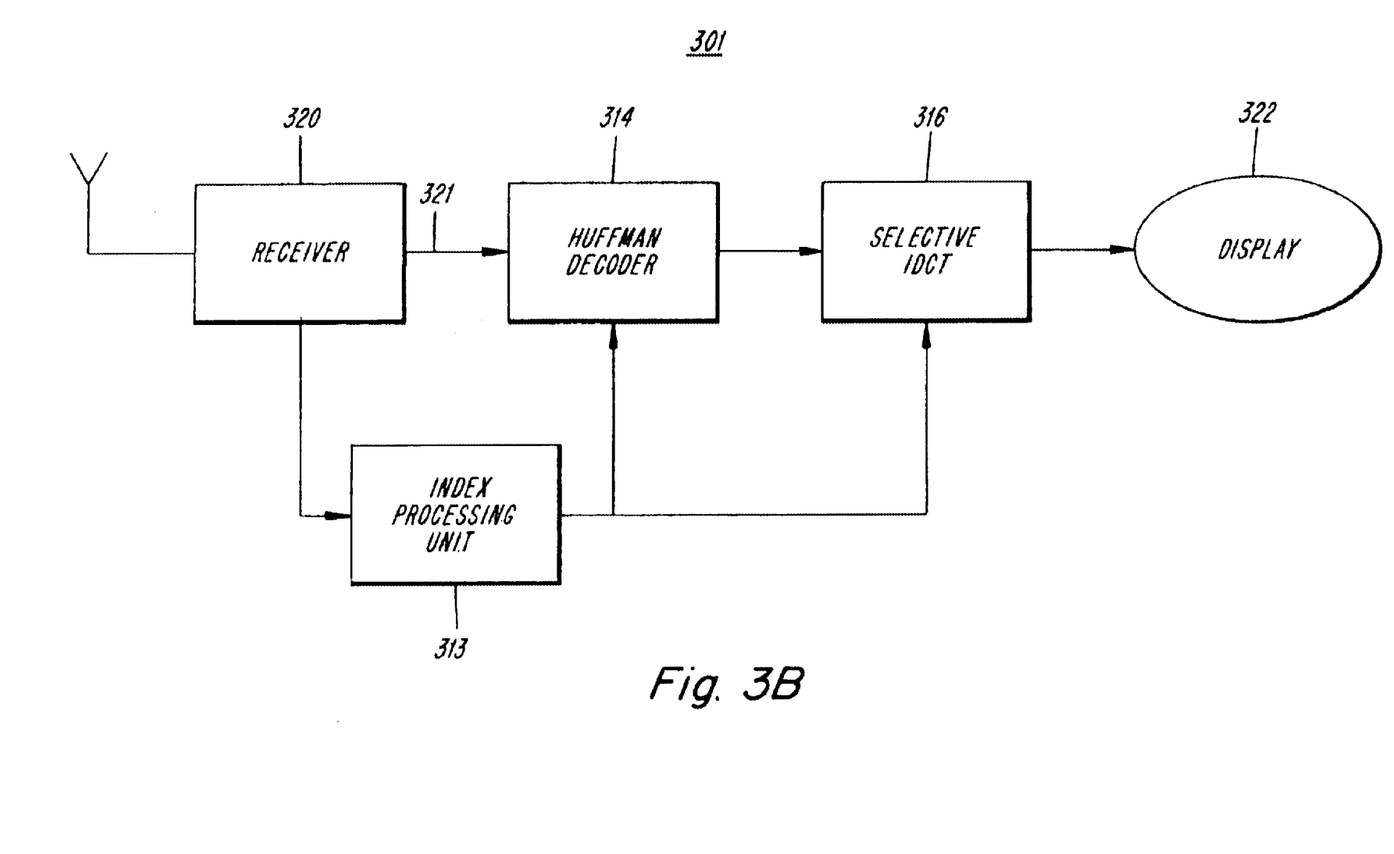

In an alternative embodiment of the present invention, the signal received by the receiver 320 can also include a signal based on an index matrix which was produced by an indexing and thresholding stage in the transmitter. This signal can be, for example, transmitted sequentially either before or after the compressed image data matrix, interleaved with the compressed image data matrix, or it can be sent via a side band signal. FIG. 3B illustrates a receiver stage 301 for a mobile communication device such as a mobile radio telephone or a personal digital assistant (PDA) which receives both a compressed image data matrix signal and a signal based on the index matrix as described above. A signal is received via receiver 320 and the compressed image data matrix 321 is extracted and provided as an input to the Huffman decoder stage 314. In addition, the receiver 320 extracts the signal based on the index matrix produced by an indexing and thresholding stage in the transmitter. This signal based on the index matrix is provided to index processing unit 313.

In one embodiment, the index processing unit 313 uses the information conveyed by the signal to quickly construct its own index matrix and provides its own signal based on the index matrix as an input of the Huffman Decoder stage 314 and an input of the selective IDCT stage 316. The output of the Huffman decoder stage 314 is provided to the input of the selective IDCT stage 316. The output of the selective IDCT stage 316 is the reconstructed image signal and may be, for example, displayed on the display 322 of the mobile communication device. Both the Huffman decoder stage 314 and the selective IDCT stage 316 reduce their computation requirements by using the signal based on the index matrix to operate on only the values of the compressed image data matrix 321 that exceed the threshold.

In another alternative embodiment of the present invention, the signal based on the index matrix received at the receiver is already in a form that permits it to be sent directly to the Huffman decoder stage 314 and the selective IDCT stage 316 without the use of the index processing unit 313.

Figure 4:
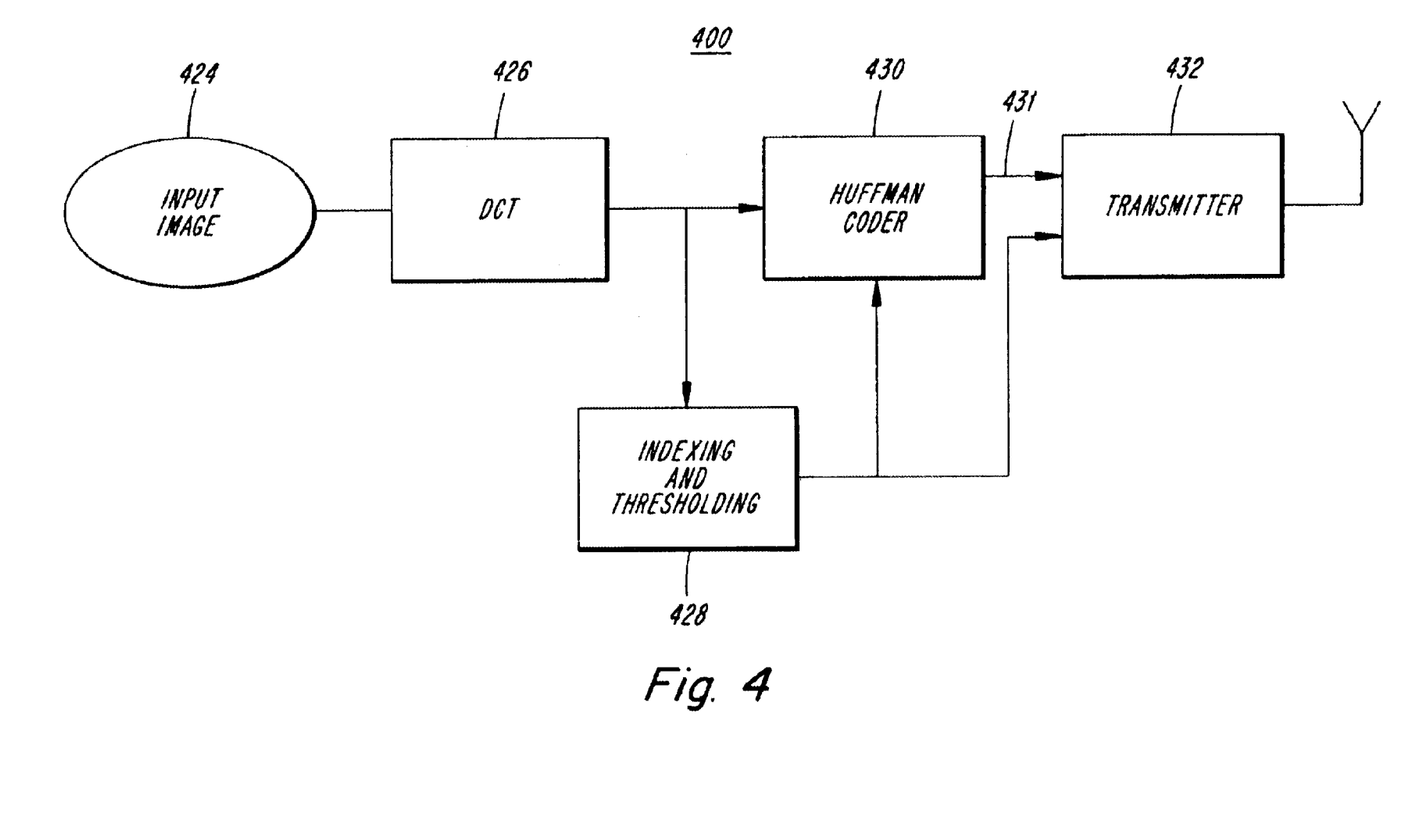
FIG. 4 illustrates an exemplary transmitter stage of a mobile communication device employing the system and method of the present invention.

FIG. 4 illustrates an image compression transmitter stage 400 for use with the mobile communication device of FIG. 3. An image is provided as an input to the image input stage 424. In an exemplary embodiment of the present invention, the image is provided via a built-in or detachable camera module. Alternatively, the image is provided via a scanner or via a data connection from a computer, computer network, or any other electronic equipment capable of producing an image signal.

The image signal is provided to an input of the DCT stage 426. The compressed image matrix supplied at the output of the DCT stage 426 is provided as an input to the indexing and thresholding stage 428 and to the Huffman coder 430. The signal based on the index matrix produced by the indexing and thresholding stage 428 is provided as an input to the Huffman coder stage 430. The Huffman coder stage 430 uses the signal based on the index matrix to save computational time by only encoding those values of the coefficients of the compressed image matrix which are above a threshold. The threshold can be, for example, the midpoint of the range of the coefficients of the compressed image matrix. In embodiments where normalized matrix coefficients are compared with the threshold, the threshold can be, for example, in the range of 0.0 to about 0.5. In an exemplary embodiment of the present invention, the Huffman coder stage 430 uses a conventional JPEG look-up table to obtain the bit allocation to be sent to the transmitter 432. By using the signal based on the index matrix the complexity and computational time is reduced.

In alternative embodiments of the present invention, the signal based on the index matrix is also provided as an input to the transmitter 432. The transmitter transmits the signal based on the index matrix, for example, as a side band signal or interleaved with the compressed image matrix.

In additional alternative embodiments of the present invention, the transmitter 432 can utilize the signal based on the index matrix to transmit only those coefficients which exceed the threshold value, along with the signal based on the index matrix. In this case, the receiver can recreate the original compressed image matrix since the index of each of the received coefficients will be known to the receiver by utilizing the signal based on the index matrix. The remaining (non-transmitted) coefficients are known to be zero.

In additional alternative embodiments, as discussed with respect to FIG. 2B, an image analysis stage can be added (not shown) in between the selective IDCT stage 426 and the Huffman coder stage 430 in order to further reduce the computational requirements of the present invention. The image analysis stage calculates the rate of change of the coefficients in successive frames of the compressed image data matrix. Since it is highly likely that sequential frames of related images will possess identical or nearly identical index matrixes due to the similarities of one sequential frame to another, computational time can be reduced by sending a signal to the indexing and thresholding stage 428 to create a new index matrix only once every x frames. The value of x is determined by the image analysis stage based on the rate of change of the image.

In summary, the present invention provides improved methods and apparatus for the compression and decompression of a image signal. One skilled in the art will readily recognize that the present invention can encode and decode any image signal which utilizes the discrete cosine transform.

Those skilled in the art will appreciate that the present invention is not limited to the specific exemplary embodiments which have been described herein for purposes of illustration and that numerous alternative embodiments are also contemplated. For example, though the invention has been described in the context of mobile communications applications, those skilled in the art will appreciate that the teachings of the invention are equally applicable in any signal processing application in which it is desirable to encode and decode image signals while saving time and memory resources. The scope of the invention is therefore defined by the claims which are appended hereto, rather than the foregoing description, and all equivalents which are consistent with the meaning of the claims are intended to be embraced therein.

What is claimed is:

1. A decoder comprising:
   an indexing and thresholding stage that receives a compressed image matrix and produces therefrom a signal that is based on a comparison of at least one element in said compressed image matrix with a predetermined threshold value; and
   a transform stage coupled to receive said compressed image matrix and said signal from an output of said indexing and thresholding stage,
   wherein said transform stage selectively decodes said compressed image matrix based on said signal.

2. The decoder of claim 1, wherein said signal includes an index matrix.

3. The decoder of claim 2, further comprising:
   an image analysis stage that calculates the rate of change of the coefficients in successive frames of the compressed image matrix and produces a signal based on the calculated rate of change; and
   wherein the indexing and thresholding stage produces the index matrix based on the rate of change calculation.

4. The decoder of claim 1, wherein said signal identifies at least one pair of indices which corresponds to at least one element of said compressed image matrix which has a value above said predetermined threshold.

5. The decoder of claim 1, wherein said signal identifies at least one pair of indices which corresponds to at least one element of said compressed image matrix which has a value equal to or below said predetermined threshold.

6. The decoder of claim 1, wherein said predetermined threshold is less than or equal to one half of the range of all elements in said compressed image matrix.

7. The decoder of claim 1, wherein said at least one element is normalized prior to the comparison with said predetermined threshold to a range of 0.0 to 1.0, and wherein said predetermined threshold is in a range of 0.0 to about 0.5.

8. The decoder of claim 1, wherein said transform stage utilizes only elements of said compressed image matrix that are greater than said predetermined threshold.

9. The decoder of claim 1, wherein said decoder further comprises:
   an image analyzer, wherein said image analyzer determines a rate at which said indexing and thresholding stage produces said second matrix.

10. The decoder of claim 9, wherein said rate is 1 in 2.

11. The decoder of claim 9, wherein said rate is 1 in 4.

12. The decoder of claim 1, wherein said compressed image matrix is a single frame of a compressed image matrix signal, and wherein said transform stage decodes said compressed image matrix based on a signal produced by said indexing and thresholding stage corresponding to a previous frame of said compressed image matrix signal.

13. The decoder of claim 1, wherein the predetermined threshold value is varied based on quality of service parameters.

14. A communication device comprising:
   a receiver;
   a decoder, said decoder comprising:
      an indexing and thresholding stage that receives a compressed image matrix via said receiver and produces therefrom a signal that is based on a comparison of at least one element in said compressed image matrix with a predetermined threshold value and
      a transform stage coupled to receive said compressed image matrix and said signal from an output of said indexing and thresholding stage,
      wherein said transform stage selectively decodes said compressed image matrix based on said signal.

15. The device of claim 14, wherein said signal includes an index matrix.

16. The device of claim 15, wherein the decoder further comprises
   an image analysis stage that calculates the rate of change of the coefficients in successive frames of the compressed image matrix and produces a signal based on the calculated rate of change; and
   wherein the indexing and thresholding stage produces the index matrix based on the rate of change calculation.

17. The device of claim 14, wherein said signal identifies at least one pair of indices which corresponds to at least one element of said compressed image matrix which has a value above said predetermined threshold.

18. The device of claim 14, wherein said signal identifies at least one pair of indices which corresponds to at least one element of said compressed image matrix which has a value equal or below said predetermined threshold.

19. The device of claim 14, wherein said predetermined threshold is less than or equal to one half of the range of all elements in said compressed image matrix.

20. The device of claim 14, herein said at least one element is normalized prior to the comparison with said predetermined threshold to a range of 0.0 to 1.0, and wherein said predetermined threshold is in a range of 0.0 to about 0.5.

21. The device of claim 14, wherein the predetermined threshold value is varied based on quality of service parameters.

22. A method for decoding a compressed image matrix comprising:
   receiving, by an indexing and thresholding stage, a compressed image matrix;
   producing, by said indexing and thresholding stage, a signal which is based on a comparison of at least one element in said compressed image matrix with a predetermined threshold value;
   receiving, by a transform stage, said compressed image matrix and said signal produced by said indexing and thresholding stage; and
   selectively decoding, by said transform stage, the received compressed image matrix based on said signal.

23. The method of claim 22, wherein said signal includes an index matrix.

24. The method of claim 23, further comprising:
   calculating the rate of change of coefficients in successive frames of the compressed image matrix; and
   producing the index matrix based on the rate of change calculation.

25. The method of claim 22, wherein said signal identifies at least one pair of indices which corresponds to at least one element of said compressed image matrix which has a value above said predetermined threshold.

26. The method of claim 22, wherein said signal identifies at least one pair of indices which corresponds to at least one element of said compressed image matrix which has a value equal or below said predetermined threshold.

27. The method of claim 22, wherein said predetermined threshold is less than or equal to one half of the range of all elements in said compressed image matrix.

28. The method of claim 22, wherein said at least one element is normalized prior to the comparison with said predetermined threshold to a range of 0.0 to 1.0, and wherein said predetermined threshold is in a range of 0.0 to about 0.5.

29. The method of claim 22, wherein said selectively decoding step further comprises:
   utilizing only elements of said compressed image matrix that are greater than said predetermined threshold.

30. The method of claim 22, wherein said method further comprises:
   determining a rate at which said signal is produced.

31. The method of claim 30, wherein said rate is 1 in 2.

32. The method of claim 30, wherein said rate is 1 in 3.

33. The method of claim 22, wherein said compressed image matrix is a single frame of a compressed image matrix signal, said selectively decoding step further comprising:
   decoding said compressed image matrix based on a signal produced by comparing at least one element of a compressed image matrix corresponding to a previous frame of said compressed image matrix signal.

34. The method of claim 22, wherein the predetermined threshold value is varied base on quality of service parameters.

* * * * *